May 14, 1946.  R. L. AKERS  2,400,218
POWER STEERING MECHANISM FOR VEHICLES
Filed Jan. 13, 1945  2 Sheets-Sheet 1
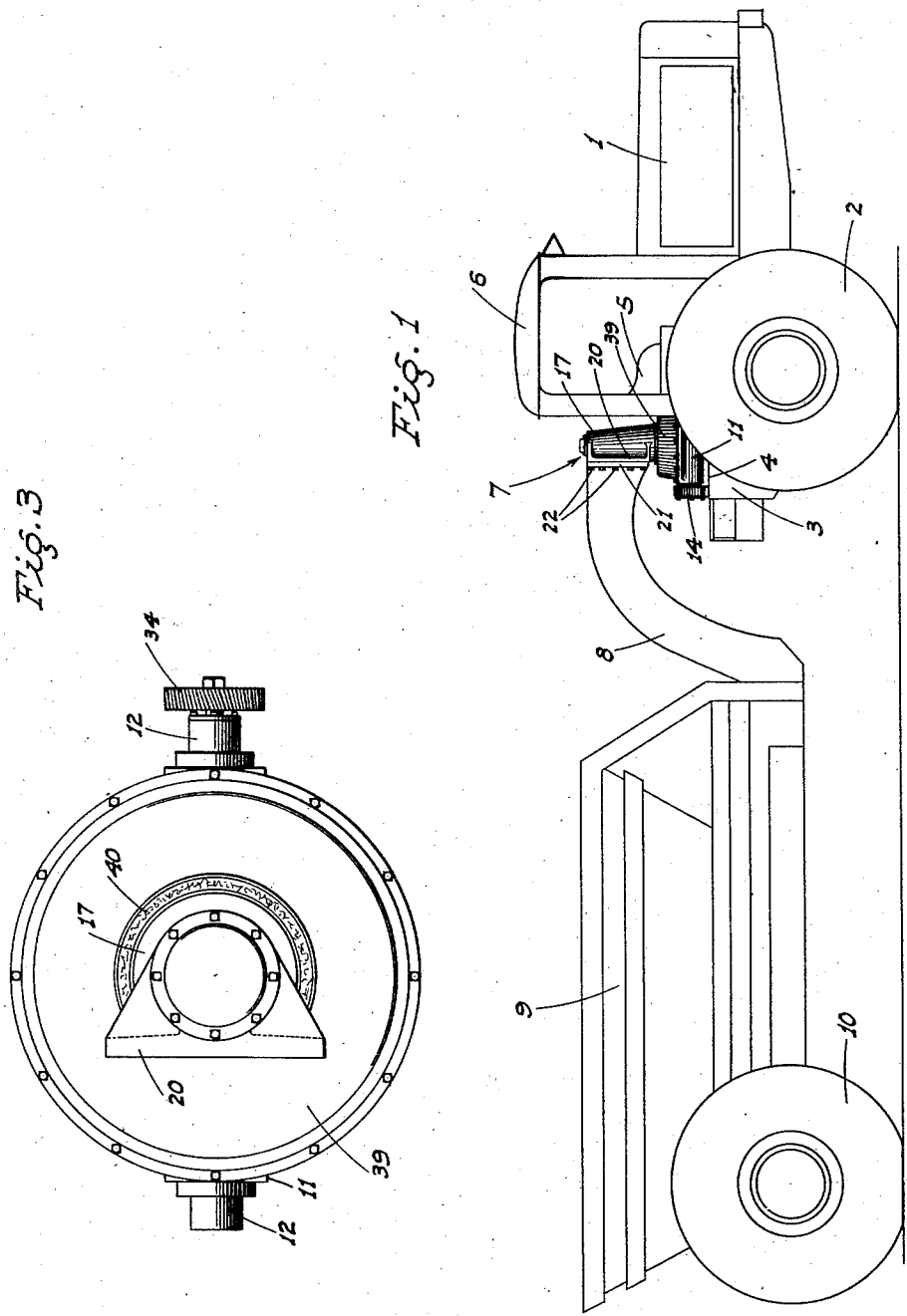
INVENTOR
R.L.Akers
BY
ATTORNEYS

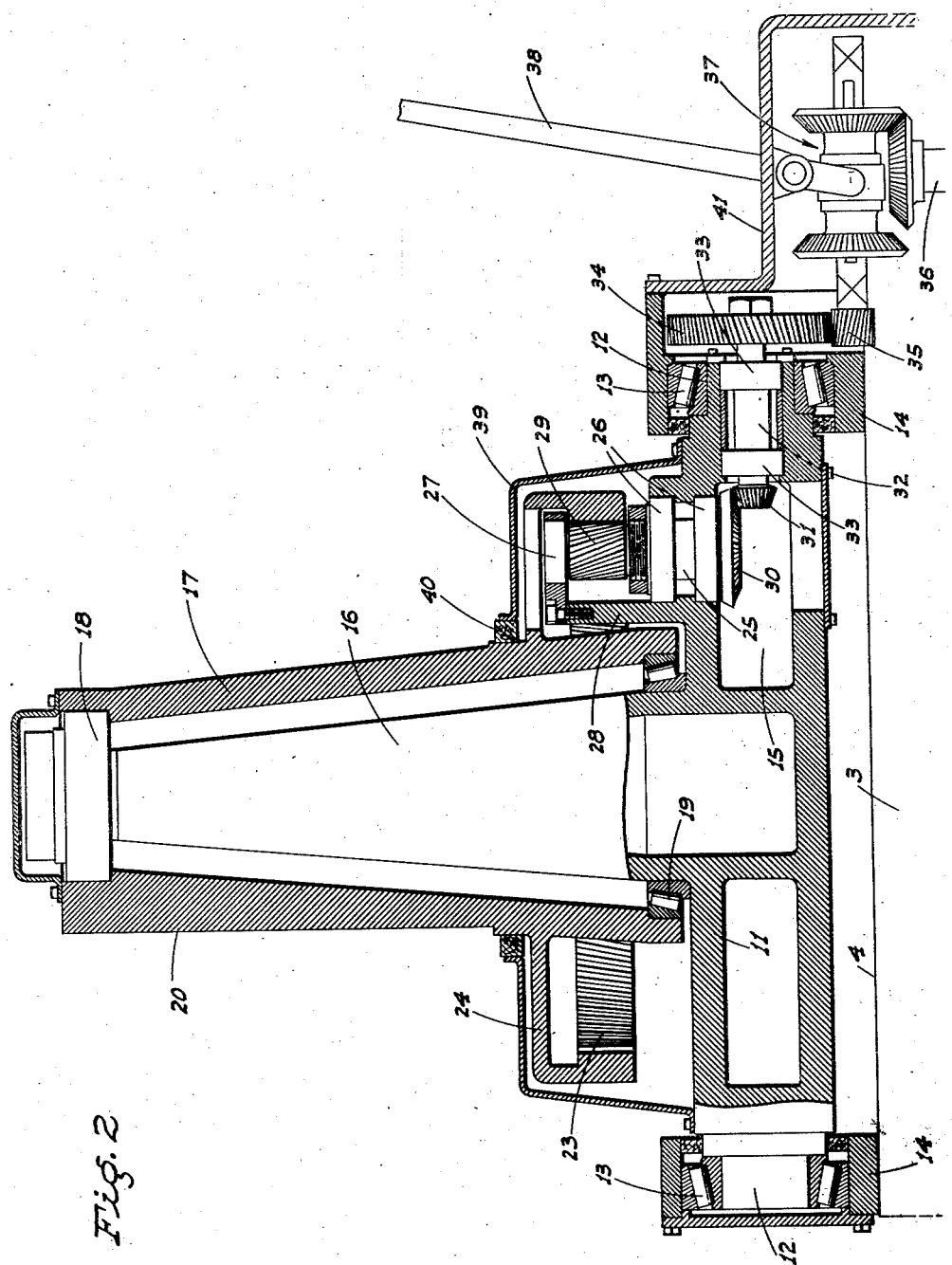

Patented May 14, 1946

2,400,218

UNITED STATES PATENT OFFICE 2,400,218

POWER STEERING MECHANISM FOR VEHICLES

Richard L. Akers, Peoria, Ill., assignor to R. G. Le Tourneau, Inc., Stockton, Calif., a corporation of California Application January 13, 1945, Serial No. 572,684

9 Claims. (Cl. 180—79.4)

This invention is directed to a power steering device for a vehicle combination comprising a tractor connected in draft relation to a trailer by means of a coupling assembly; the steering device being of the type which is incorporated in said coupling assembly and operative to cause power steering of the tractor relative to the trailer.

The present invention represents a modification of the Power steer shown in co-pending U. S. patent application, Serial No. 570,530, filed December 30, 1944.

Another object of this invention is to provide a steering device, as above, which is power driven from an engine actuated shaft on the tractor through the medium of a simple and reversible drive mechanism, yet a mechanism which is heavy duty and requires no special serving or maintenance.

A further object of this invention is to provide a power steering device of the type described which comprises a pair of members mounted together for relative rotation about an upstanding axis, means mounting one member on the tractor adjacent the rear thereof in laterally tiltable but tractor-steering relation, means securing the other member in rigid draft relation to the trailer, and novel tractor-engine actuated driving mechanism connected between said members operative to effect relative rotation thereof and resultant steering of the tractor regardless of the steering angle of the tractor or the relative lateral tilt between the same and the trailer.

A further object of the invention is to produce a simple and inexpensive device, and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a side elevation of a vehicle combination embodying the power steering device which is the subject of the present invention.

Figure 2 is a longitudinal sectional elevation of the power steering device.

Figure 3 is a plan view of the device, detached.

Referring now more particularly to the characters of reference on the drawings, the steering device is here shown as embodied in a vehicle combination which includes a tractor, indicated generally at 1, of the "Tournapull" type; such tractor including transversely spaced ground engaging drive wheels 2 supported by a transmission case 3 disposed therebetween, said case 3 being formed at the rear portion thereof with an upwardly facing deck 4. Ahead of the deck 4 the tractor includes an operator's seat 5 enclosed in a cab 6.

The power steering device is indicated at 7, being connected between the deck 4 of the tractor 1 and the front end of a rigid draft tongue 8 which projects forwardly in fixed relation from a trailer, indicated generally at 9. Although the trailer is here shown as an earth carrying dump wagon including transversely spaced rear wheels 10, obviously other types of trailers may be used with the present steering device, and which steering device comprises the following structural arrangement:

A rocking member 11 is disposed above the deck 4 of the tractor 1 and extends lengthwise of the later in a generally horizontal plane; said rocking member being formed at opposite ends with trunnions 12 carried in bearings 13 mounted in connection with and supported by brackets 14 which are fixed to and upstand from the deck 4. The rocking member 11 is formed, at one end portion at least, as a hollow case, which provides a chamber 15 for the purpose hereinafter described.

A heavy-duty, tubular king pin 16 is mounted on and upstands in rigid relation from the rocking member 11 centrally of the same, and said king pin relatively rotatably supports a heavy-duty sleeve 17 by means of top and bottom bearings, indicated at 18 and 19, respectively.

The sleeve 17 is formed with a flat, vertical and normally rearwardly facing back wall 20 to which a matching attachment plate 21 on the forward end of the draft tongue is rigidly but detachably connected by bolts 22.

An internal ring gear 23 surrounds the lower end portion of the sleeve 17 in spaced, concentric relation; said gear being rigidly affixed in connection with the sleeve 17 by means of an annular flange 24 which extends radially from the sleeve in overhanging relation to the gear and thence depends to connect with the latter at its periphery.

A stub shaft 25 extends from within the chamber 15 upwardly through bearings 26 mounted in the adjacent upper portion of the rocking member 11, said shaft thence projecting upwardly into a vertically spaced bearing 27 disposed within the confines of the gear 23 and supported by a bracket 28 which upstands from the rocking member 11 alongside the lower end portion of the sleeve 17. Between the bearings 26 and 27 shaft 25 carries a pinion 29 which runs in constant mesh with the internal gear 23.

Within the chamber 15 the shaft 25 is fixed, at its lower end, with a bevel gear 30, with which a bevel pinion 31 constantly meshes; said pinion being fixed on the inner end of a horizontal shaft 32 supported axially of the rocking member 11 by longitudinally spaced bearings 33 mounted in the corresponding trunnion 12, which is tubular.

At its outer end the shaft 32 is provided with a driving gear 34 driven by a pinion 35. The pinion 35 is driven from a drive shaft 36 which extends from within the transmission case 3, by means of a manually controlled reversible driving unit 37, which may be of any suitable type but which is here indicated diagrammatically as a reversing gear assembly, including a control lever 38 operable by the tractor driver.

The assembly of gear 29 and pinion 29 are enclosed by an annular protective hood 39 fixed in connection with the rocking member 11 and including a circular seal 40 which rides the sleeve 17 directly above the gear supporting flange 24. The assembly of gear 34, pinion 35, and reversing assembly is also protected by an enclosing housing 41.

By reason of the above described arrangement, the tractor is connected in draft, as well as steerable, relation to the trailer, and said tractor is power-steerable regardless of the relative lateral tilt between the same and the trailer as the vehicle combination traverses uneven ground; the relative steering being possible through the medium of the relatively turnable king pin 16 and sleeve 17, while the relative lateral tilting between the tractor and trailer is accomplished through the use of the rocking member 11 mounted as described.

Power steering of the tractor relative to the trailer results upon driving of the pinion 29 in one direction or the other. When the pinion 29 is driven, the leverage exerted by the trailer is such that said pinion causes the rocking member 11 and king pin 16 to rotate relative to the sleeve 17, and as said rocking member and king pin are mounted in steerable relation to the tractor, steering of the latter results.

As the shaft 32 is mounted axially of the rocking member 11, the latter can rock about said shaft, upon relative lateral tilting between the tractor and trailer, without interference in any way with the drive for the power steering mechanism.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A power steering device for a tractor and trailer combination, comprising a pair of members mounted together for relative rotation about an upstanding axis, means rigidly connecting one member with the trailer, means connecting the other member with the tractor in laterally tiltable but tractor-steering relation, reversible driving mechanism between said members operative to cause relative rotation therebetween, and power means on the tractor arranged to reversibly drive said mechanism; the latter including a reversibly driven shaft about the axis of which said other member pivots upon lateral tilting thereof.

2. A power steering device for a tractor and trailer combination, comprising a pair of members mounted together for relative rotation about an upstanding axis, means rigidly connecting one member with the trailer, means connecting the other member with the tractor in laterally tiltable but tractor-steering relation, reversible driving mechanism between said members operative to cause relative rotation therebetween, and power means on the tractor arranged to reversibly drive said mechanism; said last named connecting means including a rocking member journaled on the tractor lengthwise thereof, and said driving mechanism including a reversibly driven shaft extending axially in said rocking member.

3. A power steering device for a tractor and trailer combination, comprising a pair of members mounted together for relative rotation about an upstanding axis, means rigidly connecting one member with the trailer, means connecting the other member with the tractor in laterally tiltable but tractor-steering relation, reversible driving mechanism between said members operative to cause relative rotation therebetween, and power means on the tractor arranged to reversibly drive said mechanism; said driving mechanism including a reversibly driven shaft about the axis of which said other member pivots upon lateral tilting thereof, another shaft journaled on said other member at a right angle to said driven shaft, meshing gears coupling adjacent portions of said shafts, and rotation imparting connections between said other shaft and said one member operative to cause relative rotation between said members upon rotation of said other shaft.

4. A power steering device for a tractor and trailer combination, comprising a pair of members mounted together for relative rotation about an upstanding axis, means rigidly connecting one member with the trailer, means connecting the other member with the tractor in laterally tiltable but tractor-steering relation, reversible driving mechanism between said members operative to cause relative rotation therebetween, and power means on the tractor arranged to reversibly drive said mechanism; said driving mechanism including a reversibly driven shaft about the axis of which said other member pivots upon lateral tilting thereof, another shaft journaled on said other member at a right angle to said driven shaft, meshing gears coupling adjacent portions of said shafts, and rotation imparting connections between said other shaft and said one member operative to cause relative rotation between said members upon rotation of said other shaft; said rotation imparting connections comprising meshing gears, one fixed on said other shaft and one fixed on said one member.

5. A power steering device for a tractor and trailer combination, comprising a pair of members mounted together for relative rotation about an upstanding axis, means rigidly connecting one member with the trailer, means connecting the other member with the tractor in laterally tiltable but tractor-steering relation, reversible driving mechanism between said members operative to cause relative rotation therebetween, and power means on the tractor arranged to reversibly drive said mechanism; said driving mechanism including a reversibly driven shaft about the axis of which said member pivots upon lateral tilting thereof, another shaft journaled on said other member at a right angle to said driven shaft, meshing gears coupling adjacent portions of said shafts, a pinion fixed on said other shaft, and a meshing gear fixed on said one member.

6. A device as in claim 5 including a protective hood surrounding said pinion and gear assembly; said hood being annular and concentric to said one member and fixed on the other member.

7. A power steering device for a tractor and trailer combination, comprising an upstanding king pin, a rocking member journaled lengthwise on the tractor adjacent the rear thereof, the king pin being rigidly mounted on the rocking member for lateral tilting movement about the axis of the latter, a sleeve rotatably mounted on the king pin, means rigidly connecting the sleeve and trailer in rigid relation, reversible driving mechanism between the king pin and sleeve operative to cause relative rotation therebetween, and power means on the tractor arranged to reversibly drive said mechanism; said mechanism including a reversibly driven shaft about which the rocking member is rotatable as an axis.

8. A power steering device for a tractor and trailer combination, comprising an upstanding king pin, a rocking member journaled lengthwise on the tractor adjacent the rear thereof, the king pin being rigidly mounted on the rocking member for lateral tilting movement about the axis of the latter, a sleeve rotatably mounted on the king pin, means rigidly connecting the sleeve and trailer in rigid relation, reversible driving mechanism between the king pin and sleeve operative to cause relative rotation therebetween, and power means on the tractor arranged to reversibly drive said mechanism; said driving mechaism including a reversibly driven shaft extending into and about which said rocking member pivots upon rotation of the latter, another shaft journaled on the rocking member at a right angle to said driven shaft and parallel to but to one side of the sleeve, meshing gears coupling adjacent portions of said shafts, a pinion on the other shaft adjacent the sleeve, and a gear fixed on the sleeve and with which gear the pinion runs in mesh.

9. A device as in claim 8 in which the rocking member projects laterally at one end portion and beyond the king pin; said end portion being hollow and forming a chamber, and said meshing gears being disposed in said chamber.

RICHARD L. AKERS.